United States Patent [19]
Rogers

[11] Patent Number: 4,942,191
[45] Date of Patent: Jul. 17, 1990

[54] ALDEHYDE CONDENSATION RESIN GLUE COMPOSITIONS HAVING PEA AND OTHER LEGUMINOUS FLOUR EXTENDERS

[75] Inventor: John W. Rogers, Richmond, Canada

[73] Assignee: Borden, Inc., Columbus, Ohio

[21] Appl. No.: 186,052

[22] Filed: Apr. 25, 1988

[51] Int. Cl.$^5$ ................................................ C08K 5/00
[52] U.S. Cl. ........................................ 524/17; 524/25; 524/47
[58] Field of Search .............................. 524/17, 47, 25

[56] References Cited

U.S. PATENT DOCUMENTS

| | | | |
|---|---|---|---|
| 1,245,980 | 11/1917 | Satow | 527/205 |
| 2,365,671 | 12/1944 | Watt | 524/17 |
| 2,374,042 | 4/1945 | Gilboe et al. | 524/25 |
| 2,376,133 | 5/1945 | Ford et al. | 524/25 |
| 2,376,607 | 5/1946 | Lum et al. | 524/17 |
| 2,407,225 | 9/1946 | Dixon | 524/47 |
| 2,580,890 | 1/1952 | Clark, Jr. | 524/17 |
| 3,419,507 | 12/1968 | Brown | 524/17 |
| 3,471,420 | 10/1969 | Campbell | 524/25 |
| 3,701,743 | 10/1972 | Horwitz et al. | 428/529 |
| 3,746,670 | 7/1973 | McGuire | 524/47 |
| 3,984,275 | 10/1976 | Hofmann et al. | 156/328 |
| 4,018,959 | 4/1977 | Demko et al. | 428/182 |
| 4,070,314 | 1/1978 | Alexander et al. | 524/14 |
| 4,244,846 | 1/1981 | Edler | 524/14 |
| 4,311,621 | 1/1982 | Nishizawa et al. | 524/13 |
| 4,562,218 | 12/1985 | Fornadel et al. | 524/15 |
| 4,587,332 | 5/1986 | Lane et al. | 536/102 |

FOREIGN PATENT DOCUMENTS

| | | | |
|---|---|---|---|
| 56-127675 | 10/1981 | Japan | 524/17 |
| 60-238377 | 11/1985 | Japan | 524/47 |

OTHER PUBLICATIONS

"Legumes: Seed Composition and Structure, Processing into Protein Products and Protein Properties," by W. J. Wolf, Chapter 10 in Food Proteins by Witaker and Tannenbaum, AVI Publishing Co. (Westport, Conn.) 1977.

Primary Examiner—Lewis T. Jacobs
Attorney, Agent, or Firm—Fisher, Christen & Sabol

[57] ABSTRACT

Leguminous flours such as pea flours can be substituted for at least a portion of extenders (such as wheat flour) and/or fillers in glue compositions comprising aldehyde condensation resins such as urea-formaldehyde and/or phenol-formaldehyde resins without loss of bond strength. Such glue compositions provide lower storage viscosity and are often less expensive than conventional compositions. The glue compositions can be used in cured laminates of lignocellulosic materials such as plywood.

29 Claims, 3 Drawing Sheets

ALDEHYDE CONDENSATION RESIN GLUE COMPOSITIONS HAVING PEA AND OTHER LEGUMINOUS FLOUR EXTENDERS

BACKGROUND OF THE INVENTION

This invention pertains to adhesives useful in the lamination of lignocellulosic materials such as wood, especially in plywood manufacture for the bonding of thin overlays or veneers to softwood cores. Adhesives for plywood preparation, for example, must have certain working characteristics in addition to the proper adhesive properties for satisfactory performance under modern production methods. Even though good strengths may be possible under certain conditions with particular resins, the resins may not be suitable for plywood adhesives if the working characteristics are such that these results cannot be readily achieved under the accepted production methods employed in plywood manufacture.

In many processes, the adhesive is applied by spraying. Thus, in addition to the requirements that the adhesive be fast setting, have a good pot life, and have the required penetration to form a strong bond, the consistency of the adhesive has to be such that it can be readily sprayable.

Further, in many operations the assembled panels of plywood or laminated wood products are pre-pressed cold prior to heat setting of the adhesive by hot pressing. By pre-pressing the assembled panels, the capacity of the heated platen presses is increased and the quality of the laminated wood products or plywood obtained can be materially improved. In cold pre-pressing, the adhesive must form a sufficient bond to permit the handling of the pre-pressed panels without shifting or separation of the plies after the pressure is removed. The laminate or consolidated panel may be stored for various lengths of time ranging from a few minutes to hours after pre-pressing before the panels are subjected to the high temperature and pressure to finally set the adhesive. Thus the adhesive, in addition to providing the necessary initial bond, must remain after pre-pressing in a form capable of forming a strong final bond upon heat setting.

Adhesives containing urea-formaldehyde resins which are light in color are often used in overlay plywood manufacture. However, the characteristics of the adhesives are such that the adhesives may not be applied by spraying. Phenol-formaldehyde adhesives often used in plywood operations and wood laminate production are likewise not entirely satisfactory for the overlay production. In the overlay production, the overlay panel or top ply applied to the cores is commonly less than 1/16 inch in thickness, generally being 1/20 to 1/30 of an inch in thickness. It is usually of hardwood or a wood of light color. Due to the thinness and porosity of the top ply, the urea-formaldehyde resin adhesives will "bleed through" the veneer imparting dark streaks in the finished panel.

Heretofore it has been found desirable to employ gluten-containing vegetable or cereal grain flours as extenders for condensation-type resin adhesives. Such extenders are used primarily to reduce costs. An aqueous medium is generally a necessary ingredient when a gluten-containing extender is used in combination with a condensation-type resin adhesive as, for example, when the adhesive is spread over a surface to be glued or assembled. When such gluten-containing vegetable or grain flours are used as extenders, the amount of water required for the mix depends primarily upon the gluten content of the particular flour used.

In such practice, however, serious problems have arisen because, when such gluten-containing extenders have been used in substantial amounts, the "free flow" of the resin composition is retarded and the liquid adhesive is thus found to be thicker and spreadable only with difficulty. Such compositions become stringy and have a porridge-like consistency when dissolved or dispersed in water. In addition, such resin adhesives, when highly extended with a vegetable or grain flour, inevitably require the addition of large quantities of water to enable them to become spreadable. This raises further problems, however, in that when such large amounts of water are used various difficulties arise in the subsequent processing operations as, for example, when these adhesives are employed in wood laminating in hot-pressing operations. The large amount of water employed is converted into steam during the hot-pressing operations which in turn causes the formation of blisters between the laminae, thus making the finished article unfit for commercial use.

Wheat flour is used in the art of adhesives as an extender; in urea-formaldehyde hardwood plywood glues it can represent, for example, 25 percent by weight of the total glue. In phenol-formaldehyde plywood glues, the wheat flour can vary from 2.5 percent to 7 percent of the total glue and up to 54 percent of the total filler plus extender, with wide variations depending on the bran content of the flour. Since wheat flour is a staple foodstuff, it is a relatively expensive ingredient for glue mixes, and its availability varies with the world commodities market. A less expensive substitute for wheat flour which will perform at least as well as wheat flour in such glue mixes is therefore desirable for plywood manufacturing and other adhesives applications.

For example, U.S. Pat. No. 4,070,314, issued Jan. 24, 1978 to Alexander et al., discloses the use of high fiber-containing fractions from cereal grains or oil seeds, optionally in admixture with cereal flours or starches, as amylaceous extenders in synthetic resin-based plywood adhesives. The starches in extenders used in phenol-formaldehyde glues are described as gelatinizing under the highly alkaline conditions prevailing in these phenolic resin systems, thus providing the glue with increased viscosity and tack. However, with urea-formaldehyde glues, most amylaceous (starchy) materials are said to be not satisfactory, since the starch does not become gelatinized in the neutral or slightly acidic environment of the urea-formaldehyde resins. Wheat flours are stated to be the only starch-based extenders employed in contemporary plywood glues, since these materials can increase the viscosity of certain adhesive systems without the starch becoming gelatinized. This property is ascribed to the wheat gluten, which has different properties from the protein portions of other cereal grains. The Alexander patent discloses that certain by-products of the grain milling and processing industries which are high in fiber but relatively low in starch can function effectively as extenders in urea-formaldehyde resin adhesive compositions. These extender materials increase the viscosity of the adhesive compositions, apparently because of water absorption capacities which are higher than those of cereal flours and starches, and are related to the content of protein and pentosans in the fibrous products. The viscosity-increasing fibrous extenders can thus be blended with conventional starchy extenders to produce the desired viscosity in the composition, according to the patent.

U.S. Pat. 4,587,332, issued May 6, 1986 to Lane et al., relates to the production of a viscosity-reduced starch useful in Stein-Hall corrugating adhesives, wherein wheat starch is preferred. (Stein-Hall adhesives contain mainly raw starch, with gelatinized starch as a carrier, sometimes also containing a synthetic resin to improve wet strength bond characteristics.) The starches found useful are described as small granule "B" wheat starches, the crude, lighter weight starch fractions containing the smaller-size starch granules obtained by differential centrifugal sedimentation of the bimodally size-distributed starch granules found in regular or native wheat starches. Starches derived from legumes, e.g., pea starch, or from other cereals such as rye or barley, are also disclosed as useful. The starch fractions found suitable are described as containing indigenous, non-protein, non-starch materials having a hydrophilic colloidal character, such as the wheat pentosans. (The pentosans are complex carbohydrates or hemicelluloses which can be hydrolyzed to yield pentoses.) By increasing the proportion of such materials in modified starches, the lyocratic character (i.e., ability to form colloidal suspensions) of aqueous dispersions of such modified starches are increased. Starches can be treated by various centrifugal processes known in the art to increase the proportions of such components.

Air classification techniques can also be employed to produce such starch fractions; when used to fractionate pea flour, for example, such processes are described as removing large granule starch and protein components, leaving the remaining starch with an increased proportion of non-proteinaceous, non-starch hydrophilic colloids. Such "air classified" legume starches are said to be suitable for use in starch-based corrugating adhesives, except that the raw materials are not available in sufficient quantity. However, Lane et al. is not directed toward the preparation of thermosetting adhesives containing aldehyde condensation resins, such as urea-formaldehyde or phenol-formaldehyde type resinous adhesives.

U.S. Pat. 1,245,980, issued Nov. 6, 1917 to Satow, discloses the use of vegetable proteids obtained from raw materials such as bean, pea, wheat, corn or other leguminous, cereal or grain products, in the production of an electrical insulating compound. Vegetable proteids are extracted and mixed with a glutinizing agent—an aromatic compound such as a phenol. The resulting glutinized mass is treated with a condensing agent such as an active methylene compound, e.g., formaldehyde. In contrast to the normal production of water in a phenol-formaldehyde condensation reaction, the patent states that no condensation of phenol and formaldehyde molecules to form water takes place.

Many other patents relate to the production of adhesive compounds utilizing condensation resins such as urea-formaldehyde or phenol-formaldehyde resin systems in conjunction with starches derived from corn, wheat, potato, tapioca, waxy maize, sorghum, oats, barley, rice, soybeans, seeds, and nuts. See, for example, U.S. Pats. Nos. 2,407,225; 2,580,890; 3,701,743; 3,984,275, and 4,018,959. In addition to the cereal grain and vegetable starches, cellulosic materials useful as adhesive fillers and/or extenders can be obtained from nut shells, wood, barks, leaves, corncobs, coffee bean shells and the like; see U.S. Pats. Nos. 4,244,846; 4,311,621, and 4,562,218. However, the applicant knows of no published art teaching or claiming the use of legume flours such as pea flour as extenders or fillers in curable aldehyde condensation resin adhesives such as urea-formaldehyde or phenol-formaldehyde adhesive compositions.

It was, therefore, a general object of this invention to overcome the disadvantages heretofore encountered, and to improve the spreading and adhesive properties and characteristics of condensation-type resin adhesive compositions employing starchy extenders. Another object of this invention is to reduce the cost of the adhesive without sacrificing desirable properties.

Another object of this invention was to reduce the amount of water required to produce an adhesive composition of a resin and extender combination.

Still another object of this invention was to produce an adhesive composition which would have desirable cure properties, provide improved strength, would not readily blister and which would have other desirable properties when used in plywood hot-pressing operations.

SUMMARY OF THE INVENTION

The present invention relates to thermally curable adhesive compositions comprising curable aldehyde condensation resins such as urea-formaldehyde resin or phenol-formaldehyde resins, water and extenders comprising leguminous materials such as pea flour. The compositions are useful as adhesives in adhering lignocellulosics such as wood and paper, in the production of various laminates, for example, plywood. The less expensive novel extenders of the present invention can serve as replacements for the more costly wheat flour extenders in various adhesives such as urea-formaldehyde or phenol-formaldehyde plywood adhesives without adversely altering the performance properties of the adhesives.

In accordance with the invention, an adhesive composition is provided which comprises at least one curable aldehyde condensation resin and an extender comprising a leguminous flour. The resin is preferably a formaldehyde condensation resin such as, for example, a phenol-formaldehyde resin, a urea-formaldehyde resin, an aniline-formaldehyde resin, a resorcinol-formaldehyde resin or a melamine-formaldehyde resin. Combinations of such resins can be used, such as urea-formaldehyde resins modified by the addition of phenol-formaldehyde resins. The leguminous flour can be prepared from legumes such as peas, beans and lentils, or defatted peanuts and defatted soybeans, and preferably comprises at least one pea flour. In addition to the leguminous flour, the extender can contain other amylaceous extenders such as cereal grain flours and starches or high-fiber cereal byproducts such as described in U.S. Pat. No. 4,070,314. In a preferred embodiment, the leguminous flour is employed to replace at least a portion of a conventional wheat flour extender, resulting in numerous advantages as described below. Most preferably, the extender consists essentially of at least one leguminous flour.

The adhesive compositions of the present invention can be employed in the production of lignocellulosic laminates in processes comprising the application of the adhesive composition to at least one of a plurality of plies of lignocellulosic material and forming a laminate by the application of heat and pressure to cure the adhesive composition. The plies can comprise conventional laminating materials including plywood cores and veneers and the like. The resulting products are lignocellulosic laminates comprising at least two plies of lignocellulosic material cemented with a thermally-cured adhesive composition comprising at least one curable aldehyde condensation resin and an extender comprising at least one leguminous flour, for example a plywood comprising a core and at least two plies of veneer bonded with a thermally-cured adhesive as described above. While the present invention will be discussed and exemplified with specific applications to plywood, leguminous extenders can be used to improve glue compositions based upon curable aldehyde condensation resins which are useful in the production of other lignocellulosic laminates in which the glue compositions may be improved by the use of extenders.

BRIEF DESCRIPTION OF THE DRAWINGS

The present invention will be further described with reference to the drawing, in which.

DETAILED DESCRIPTION OF THE INVENTION

Figure 2:
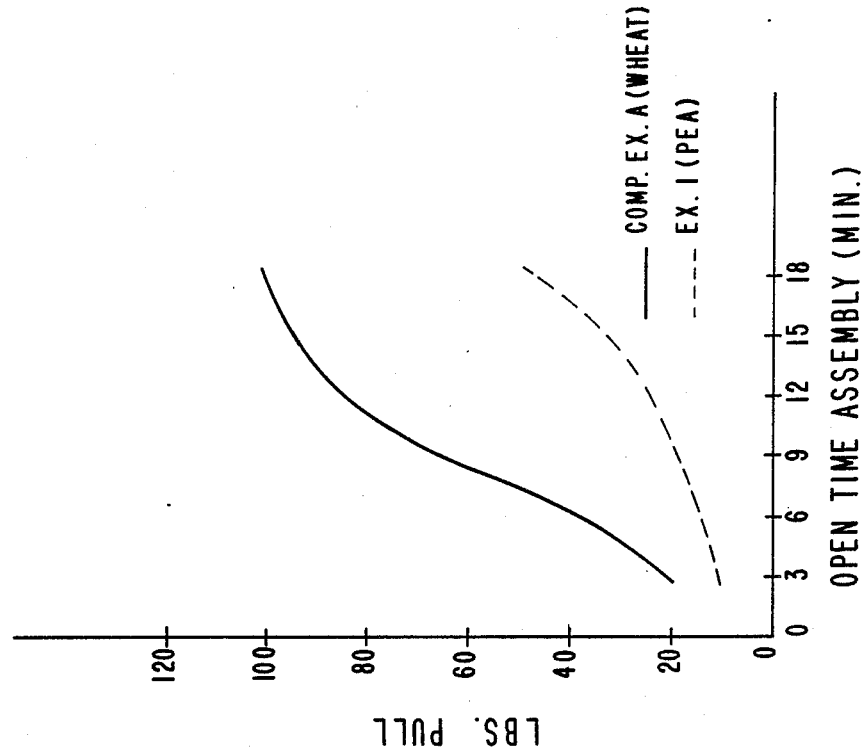
FIG. 2 illustrates the maximum pounds pull attained on a 37.5 sq. in. cross section of plies cold-pressed with a glue composition of the invention and a control, after varying times of assembly (open).

The thermally curable adhesive compositions of the present invention comprise at least one curable aldehyde condensation resin, preferably a formaldehyde condensation resin, and an effective amount of an extender comprising a leguminous flour. Such curable aldehyde condensation resins include, for example, urea-aldehyde resins, aniline-aldehyde resins, phenol-aldehyde resins, resorcinol-aldehyde resins, melamine-aldehyde resins, and the like. Phenol-based bodies which can be used to prepare these condensation-type resins comprise phenol and various modified phenols including amino phenol, the ortho, meta and para cresols, cresylic acid, xylenol, resorcinol, catechol, quinol (hydroquinone), pyrogallol (pyrogallic acid), phloroglucinol, or combinations thereof, and the like. The nitrogen compounds (e.g., amines, amides and triazines) which can be used to prepare the aminoplast resins of the class described comprise urea, thiourea, guanidine, methylurea, acetylurea, cyanamide, dicyanodiamide, biuret, semi-carbazide, melamine, monophenylmelamine, ammeline, thioammeline, ammelide, formoguanamine, acetoguanamine, stearoguanamine, and the like. These bodies or combinations thereof can be reacted with the various aldehydes, as a class, preferably those having from 1 to about 10 carbon atoms, to produce the condensation-type resins useful in the invention. Such aldehydes include, for example, formaldehyde, acetaldehyde, propionaldehyde, crotonaldehyde, benzaldehyde, furfuraldehyde, and the like. Formaldehyde is presently preferred.

Combinations of such resins can be used in, for example, urea-formaldehyde resin modification by the addition of a phenol-formaldehyde resin and acidification to a pH in the range of from 5 to 7, as described in U.S. Pat. No. 3,701,743, which is incorporated herein by reference.

The curable compositions of the present invention preferably comprise a urea-formaldehyde resin or a phenol-formaldehyde resin, or both, and an extender comprising at least one leguminous flour derived from a legume such as the pea plant.

Urea-formaldehyde resins generally used in wood laminating adhesives can be used for the preparation of the adhesive of the invention. Prior to the addition of other ingredients to form the adhesive composition, the resins are usually prepared by the reaction of from 0.8 to 3.0 moles of formaldehyde per mole of urea under acidic conditions in an aqueous medium. The condensation of the urea-formaldehyde resin is advanced to the extent that the urea-formaldehyde resin, as a neutralized solution at a pH in the range of 7 to 10 containing about 50–65 weight percent resin, has a viscosity in the range of about 150–400 centipoises, preferably 200–350 centipoises.

The phenol-formaldehyde resins used in the modification of the urea-formaldehyde adhesives (as in U.S. Pat. No. 3,701,743) or used without the urea-formaldehyde resins, are the alkaline-catalyzed resole resins similar to those used in plywood adhesives. These resins are usually prepared by reacting phenol with from 1.5 to 3.0 moles of formaldehyde per mole of phenol, preferably from 1.6 to 2.5 moles of formaldehyde per mole of phenol, in an aqueous medium under alkaline conditions. The condensation is carried out only to the extent that the phenol-formaldehyde resin, as a solution at a pH in the range of 11 to 13 containing about 44 weight percent resin, has a viscosity in the range of 100 to 800 centipoises, preferably in the range of 300–700 centipoises.

Although some adhesive compositions are cold-setting or curable, and leguminous flour extenders can be used therein, the present invention is directed primarily to compositions which are thermally cured by the application of heat and pressure. The aldehyde condensation resins used in the compositions are curable, forming irreversibly-crosslinked, insoluble materials when subject to elevated temperatures. Some of these resins, e.g., the resole phenol-formaldehyde resins, are known as thermoset or thermosetting resins because they set irreversibly when heated. On the other hand, the amino resins, of which urea-formaldehyde resins are typical, require the use of an acid hardener for curing. Once the hardener is added, such resins will gradually cure even at ambient conditions. Thus, application of heat and pressure to compositions comprising such amino resins produces what may be described as a heat-assisted acid-hardened cure. On the other hand, such reactions can be described as chemically-accelerated curing; see U.S. Pat. No. 4,244,846, column 2, for example.

In addition to the resins, an extender comprising a leguminous flour such as pea flour is employed in the preparation of the adhesives of this invention. The constituents are added in proportions within about the same ratios, with respect to the resin, as those normally employed for urea-formaldehyde and phenol-formaldehyde adhesives. Amylaceous extenders such as wheat flour, starches, and tapioca are often used in the art in amounts in the range of from about 1 to 50 weight percent of the resins, depending upon the type of resin and various other factors. For example, wheat flour can be used as an extender as about 25 to 50 weight percent of the resin, up to about 24 weight percent of the total glue in urea-formaldehyde hardwood plywood glues. In phenol formaldehyde plywood glues, wheat flour can be used as about 2 to 20 weight percent of the resin, about 2.5 to 7 weight percent of the total glue, and up to about 54 weight percent of the total filler plus extender. In this context, a filler is a non-adhesive ingredient, preferably cheaper than the resin, which provides bulk. An extender is normally an adhesive material which also provides bulk and "extends" the resin. Extenders of proteinaceous material, such as soya flour or dried blood may also be added in amounts in the range of from about 5 to 25 weight percent of the resins. The protein extenders, especially dried blood, shorten the high temperature set times of the adhesive. Clays and the other fillers and extenders described above, and including nutshell flour and various agricultural residues, may likewise be added to the leguminous flour in the instant invention.

In the preparation of the adhesive compositions, generally the leguminous flour, water, extenders, fillers, and other constituents of the adhesive are intermixed with resin—for example, the alkaline phenol-formaldehyde resin solution, or the urea-formaldehyde resin solution, obtained upon precondensation of the phenol or urea with the formaldehyde. For convenience and to maximize the available storage life of the adhesive composition, mixing is usually conducted at the mill site.

With urea-formaldehyde versions, the resin is added to the water, then other ingredients, and the mixture acidified to a pH in the range of 5 to 7 by the addition of organic or inorganic acids or, preferably, strong acidic salts. The acidifying agent is generally known as an acid hardener or accelerator.

The aminoplast aldehyde condensation resins can contain acidic hardeners or accelerators known in the art. For example, acidic salts of a strong acid and a weak base such as the aluminum and ammonium salts of strong mineral acids such as sulfuric, hydrochloric and nitric are useful acid hardeners. Examples include ammonium chloride, ammonium bromide, ammonium iodide, ammonium fluoride, ammonium sulfate, ammonium nitrate, ammonium phosphate and the like. The adhesive composition may be acidified during or shortly before or after the addition of the resin. Aluminum sulfate and ammonium chloride are preferably used as the acidifying constituent. Generally, an amount of from 1 to 5 weight percent of the acid hardener, based upon the weight of the urea formaldehyde resin present, is sufficient.

With phenol-formaldehyde resins, the leguminous flour can be added either to replace at least a portion of wheat flour alone in the glue mix or as a total replacement of wheat flour and optionally as a portion of filler material as well.

Aqueous mixes of such adhesive compositions may be made with amounts of water small enough to substantially eliminate blister formation in hot-pressing operations, and at the same time still have sufficient water present to give a satisfactory wet mix adhesive having good spreading characteristics; and moreover, when the leguminous flour is employed, the amount of water which is necessary to give a satisfactory mix can be less than that amount required when a wheat flour extender is employed. For example, when a certain high fiber flour denominated Woodstone Foods Superfine was employed as an extender in combination with a urea-formaldehyde condensation-type adhesive, the amount of water necessary to provide a satisfactory adhesive composition was reduced by approximately 3 percent.

In the adhesive compositions of the present invention, at least a portion of the conventional extender comprising a wheat flour or other finely divided material derived from cereal grains or the like is replaced with an amount of a leguminous flour (1) effective to produce improvements including a more stable (and preferably lower) viscosity during storage preparatory to use, and (2) preferably effective to reduce the overall cost of the extender. Most preferably, the cereal grain extender is replaced completely, so that the extender consists essentially of a leguminous flour. By a "flour" is meant a finely divided material obtained by milling or other processes having median particle sizes and particle size distributions comparable to those of commercially available wheat flours and other materials which are known by those in the art to be useful as extenders in adhesive compositions. Typically, the median particle sizes can be in the range from about 200 to about 75 microns. Alternatively, the particle sizes can be such that at least 95 percent of the particles will pass screens ranging from about 100 to about 325 mesh. The choice of the median particle size for the material may be influenced by the type of material to which the composition will be applied and the mode of application, e.g., spraying, curtain coating or roll coating as discussed in U.S. Pat. No. 4,244,846.

In preparing flours from legume seeds, the skins or hulls and/or excess fats are generally removed, and the milled material can be processed as described below to produce particles of the desired median size and size distribution. Legume seeds of high fat content should be defatted, since excess fat would hinder the buildup of viscosity in the adhesive composition. When a high fiber content is desired in the flour, the legume seeds are preferably milled with skins or hulls intact. Since legume seeds can be milled into particles including starch granules, protein bodies and other materials of varying sizes, the resulting flours can be processed to produce fractions in which starches, proteins or other materials such as fiber predominate.

Legume seeds and their properties are discussed by W. J. Wolf in "Legumes: Seed Composition and Structure, Processing into Protein Products and Protein Properties," Chapter 10 in *Food Proteins* by Whitaker and Tannenbaum, AVI Publishing Co. (Westport, Conn. 1977), (hereinafter "Wolf") which chapter is incorporated herein by reference. While commercial availability is normally a prerequisite to economic use of leguminous flours to replace wheat flour or the like, flours prepared from any suitable legume seeds can be employed in the present invention. For example, peas and beans of various types, lentils or even defatted peanuts or defatted soybeans can be used. Due to their natural low fat and high fiber content, legumes including peas, beans and lentils are preferred, and peas are presently preferred due to the improvements pea flour extenders are found to produce in plywood glue compositions. While in the past legume flours have not been available in commercial quantities suitable for use in the adhesive industry, in recent years field peas and broad beans have been extensively developed in Western Canada as new sources of protein for food and feed, making them as available as wheat flours and generally less expensive.

Among the legumes which can be employed are the common field pea (*Pisum sativum*) and chick pea (*Cicer arietinum*), lentils (*Lens esculenta*), broad bean (*Vicia faba*), mung bean (*Phaseolus aureus*), French bean (*Phaseolus vulgaris*), soybeans (*Glycine max*) and peanuts (*Arachis Hypogaea*). Most legume seeds have a high protein content (20–30 weight percent), a low fat content (2–5 percent, except for peanuts and soybeans, which are often classified as oilseeds due to their relatively high fat content) and high carbohydrate contents (55–60 percent). Starch is often the major constituent of the carbohydrate fraction. In peanuts and soybeans, the high oil content is counterbalanced by low carbohydrate contents; in soybeans, for example, little starch is found, and the carbohydrates are primarily cell wall polysaccharides plus the oligosaccharides sucrose, raffinose and stachyose. The compositions of several legume seeds are given below in Table 1, adapted from Wolf.

TABLE 1
LEGUME COMPOSITIONS[1]

| | Protein | Fat | Ash | Fiber | Carbohydrate |
|---|---|---|---|---|---|
| Chick pea | 20.6 | 5.4 | 2.8 | 10.3 | 61 |
| Lentil | 29.6 | 3.1 | 2.4 | 3.2 | 62 |
| Pea | 27.9 | 3.2 | 2.8 | 5.9 | 60 |
| Broad bean | 31.8 | 0.9 | 3.6 | 8.5 | 55 |
| Peanut | 30.0 | 50.0 | 3.1 | 3.0 | 14 |
| Soybean | 43.9 | 21.0 | 4.9 | —[2] | 30[2] |

[1]Compositions are expressed as weight percentages, on a moisture-free basis. Protein is Kjeldahl Nitrogen × (6.25). Carbohydrates are measured by difference.
[2]Fiber is included in carbohydrate value.

The legume seeds can be milled and processed by various means to produce finely divided flours of various particle size distributions and compositions, as discussed above. Various studies on the conversion of field peas into flour have been conducted by government laboratories in Western Canada, and such products are now commercially available from various sources including Woodstone Foods (Portage La Prairie, Manitoba, Canada). Either whole or dehulled peas can be pin-milled to yield a pale golden flour, containing almost 32 percent protein on a moisture-free basis when dehulled peas are used. Such products can be used as is in the compositions of the present invention or processed to vary the proportions of starch, protein or other ingredients, and to provide the appropriate median particle size and particle size distribution. As discussed above, protein and starch concentrates can be prepared from legume flours. For example, 100 pounds of pin-milled pea flour can be air classified to yield about 65 pounds of a starch fraction containing only 2.5 percent protein and about 35 pounds of a protein concentrate containing about 56 percent protein. Such starch and protein concentrates are commercially available, as are fractions high in fiber. Comparable fractions can be obtained by aqueous liquid centrifugation processes, as described at page 301 of Wolf. Such pea protein concentrates differ from soy protein concentrates in the nature of the carbohydrates present; in the pea concentrate, the insoluble polysaccharides (starch plus cell walls) are removed and the soluble sugars retained, while in soy concentrates the insoluble polysaccharides are retained and the soluble sugars removed. Similar fractions or concentrates can be prepared from broad beans and defatted peanuts, as described in Wolf.

Most of the proteins in legume seeds are globulins, which are characterized by being insoluble in water at their isoelectric points but are soluble in the presence of salts. These proteins may, however, be highly soluble in water if the pH is sufficiently removed from the isoelectric pH. The globulins of peas and most other legumes can be broken down into two major fractions which have been designated as vicilin and legumin and have differing solubility properties and molecular weights. Wolf reports at page 305 a study of the globulin fraction from 34 species of legume seeds including peanuts, soybeans, French beans and broad beans in which "remarkable similarity" was found in the composition of the proteins, with practically all species containing counterparts of vicilin and legumin. These two fractions comprise a large proportion of the total protein in a legume seed (for example, about 90 percent of the protein bodies found in broad beans). For many glue compositions, extenders and/or fillers containing proteinaceous materials are advantageous, provided economic sources of such proteins are available. Thus, it can be seen that while the leguminous flours useful in the present invention have been characterized based upon tests with commercially available pea flours, suitable extender/filler materials can readily be selected or prepared from other leguminous flours, based upon the similar properties of their protein components.

Pea flours from any source, and of all grades in general, are suitable for use in the practice of this invention. They can be prepared or selected to have the desired particle sizes and relative contents of proteins, starches, fiber and other materials appropriate to the applications intended. For example, when regular grade and "superfine" pea flours (the "superfine" being milled finer and having a higher fiber content, but about the same protein content) were used to replace part of the wheat flour extender/filler in a phenol-formaldehyde plywood glue, the initial viscosities of the regular and superfine pea flour formulations were lower and higher, respectively, than that of the control composition. However, the rate of increase of viscosity was lower for the superfine formulation, so that after about five days, both pea flour formulations had lower viscosities than that of the control composition containing a wheat flour extender. Thus, while legume flours containing at least about 20 weight percent protein, and preferably at least about 5 weight percent fiber, have been found beneficial in the present invention, legume flour fractions having higher protein contents of at least about 50 weight percent can be used to advantage where economics permit. For certain applications, good results may be obtained with legume flour fractions containing less protein and more starch, e.g., less than about 20 weight percent protein and greater than about 60 weight percent starch.

While not wishing to be bound by theory, it is believed that one of the reasons the legume flours perform so well as an extender in urea-formaldehyde and phenol-formaldehyde resin systems is their relatively high protein content compared with conventional extenders such as wheat flour. For example, pea flour contains at least approximately 25 percent protein, which is a higher amino content than in, for example, bran hulls and fibers. The high amino content appears to have a significant positive impact on the adhesion, viscosity reduction, viscosity stabilization and cure of the adhesive compositions of the present invention, as with other proteinaceous extender materials. It is further believed that benefits may also be obtained from the presence of certain non-starch, non-protein hydrophilic colloids in the fractions of the pea flour or other leguminous flours which are employed in the adhesive compositions of the present invention. Such materials are described in U.S. Pat. No. 4,587,332, as discussed above.

The inventive adhesives thus prepared, using for example a phenol-formaldehyde resin condensed to a particular point, and mixed with pea flour, will not become stringy under normal conditions. The mixtures usually have a viscosity in the range of 1200 to 2400 centipoises, maintain the desired consistency, and can be readily applied to wood laminates or plies by spraying. Good bonds are obtained upon cold pressing and the final heat setting by conventional hot pressing. The adhesive compositions of the present invention can be prepared by those skilled in the art for employment in laminating various lignocellulosic materials to form laminates such as plywood.

The adhesives of the present invention are prepared by replacing at least a portion of the wheat flour in commercial adhesives such as urea-formaldehyde/wheat flour or phenol-formaldehyde/wheat flour glue mixes with a leguminous flour such as a pea flour. The adhesive compositions of the present invention preferably range in percent by weight (overall) of leguminous flour from about 2 to about 20 for phenolic-aldehyde resins such as phenol-formaldehyde resins and from about 2 to about 30 for aminoplast-aldehyde resins such as urea-formaldehyde resins. In addition, other fillers, extenders, process aids, hardeners, catalysts, curing agents and the like can be added to the compositions.

An observed advantage of the use of pea flour in phenol-formaldehyde adhesives prepared in accordance with the present invention over the use of wheat flour in the prior art, is in the relative viscosity stability of the adhesive mix over time. This exemplified advantage is believed to be representative of the advantages of employing leguminous flour extenders in adhesive compositions containing aldehyde condensation resins in general, although the benefits are more significant for compositions comprising thermosetting resins such as phenol-formaldehyde as compared to the aminoplast resins such as urea-formaldehyde.

The usable life of a hot press resin formulation can be several days or more. The usable life, sometimes referred to as storage life, is limited in practice by the rate of gain of viscosity of the stored adhesive with time, this becoming more rapid with increased temperature of storage.

Pea flour, or other leguminous flours, by conferring relative viscosity stability to the adhesive formulation, also confers more latitude in the preparation of the formulation.

Another observed advantage of substituting leguminous flours for wheat flour extenders is a reduction in cost of the glue compositions, provided that leguminous flours less expensive than wheat flours are used. Surprisingly, in some formulations it was discovered that when a "superfine" pea flour with a relatively high fiber content was used as part of the extender in a phenol-formaldehyde plywood glue composition, some of the filler could be replaced by water without adverse effects, thus producing an even less expensive but equally effective glue composition.

A preferred embodiment of the present invention is an adhesive composition comprising water, urea-formaldehyde resin, pea flour and hardener. Another preferred embodiment of the present invention is an adhesive composition comprising water, phenol-formaldehyde resin, pea flour and organic or inorganic fillers.

EXAMPLES

The following specific examples are set forth to more fully describe, but are not intended to limit, the scope of this invention. The numbered examples represent the present invention, while the lettered examples do not represent the present invention, but are for comparison purposes.

The following abbreviations and designations used in the examples and elsewhere in the present application have the following meanings:

| ABBREVIATION | DEFINITION |
|---|---|
| BCW2001 | A lignin-modified phenol-formaldehyde resin obtained from Borden Chemical in Vancouver, Canada. |
| CR2664 resin | A urea-formaldehyde resin for hardwood plywood made by Borden Chemical in Vancouver, Canada. |
| C.T.A. | Closed Time Assembly. |
| in./min. | inches per minute-velocity. |
| min. | minutes. |
| O.T.A. | Open Time Assembly. |
| P.T. | Press Time - minutes in hot press. |
| Pea flour | Obtained from Woodstone Foods, Alberta, Canada, in two grades, namely "Century flour" which has 2 percent crude fiber content, and "Superfine" which has about 10 percent crude fiber content and will pass completely through a 100 mesh sieve. |
| Plybond ® AC | A corncob residue filler for phenolic resins, available from Asbury Graphite company. |
| psi | pounds per square inch. |
| "Rogers Phenolic midds" | A commercial wheat flour, fractionated based on percent bran and intended for use in phenol-formaldehyde resin adhesives, obtained from Rogers Flours in Armstrong, Canada. |
| Shear Test | In accordance with CSA (Canadian Standards Association) Standard 0121-M1978, section 5.1.42. |
| Soda ash | Sodium carbonate. |
| Sterox ® DJ | A defoamer manufactured by Monsanto |
| T.A. | Time Assembly. |
| T.A.S. | Total available solids. |
| Urea wheat flour | A fine commercial grade of wheat flour possessing very little bran and intended for use with urea-formaldehyde resin adhesives, available from various commercial mills. |
| Viscosity 26MMD | Viscosity as measured with a MacMichael viscometer with No. 26 torsion wire; in MacMichael units. |
| V.P. | Vacuum pressure. |
| Walderfil ® | An Alderbark filler for resins, available from Laurence & David. |
| W268 hardener | An acid salt hardener for urea-formaldehyde resin available from Borden Chemical of Vancouver, Canada. |

Two types of pea flour processed from yellow field peas by Woodstone Foods were used—"Century" and "Superfines." Typical analyses and particle sizes of these products are shown below in Table 1:

TABLE 1

Typical Analyses of Woodstone Foods Pea Flours

| Chemical component | (wt. %, dry basis) | |
|---|---|---|
| | Century ® | Superfines ® |
| Protein (Kjeldahl N × 6.25) | 25 | 25 |
| Moisture (dry 16 hrs at 100° C.) | 7 | 9 |
| Fat (AOAC 7.060, 14th Ed.) | 2 | 1 |
| Ash (AOAC 14.006, 14th Ed.) | 3 | 4 |
| Crude Fiber (AOAC 7.068, 14th Ed.) | 2 | 10 |
| Particle size - 95% through __ mesh | 70 | 100 mesh |

EXAMPLE 1 AND COMPARATIVE EXAMPLE A

REPLACEMENT OF WHEAT FLOUR BY PEA FLOUR IN UREA-FORMALDEHYDE RESIN TIMBER PLYWOOD GLUE

Timber plywood type glue compositions based on a urea-formaldehyde resin obtained from Borden Chemical were prepared, using either wheat flour or pea flour as the extender. The ingredients were conventionally mixed, adding the resin in two increments and mixing all ingredients but the hardener for 10 minutes, followed by addition of the hardener and final mixing.

The glue compositions were tested immediately after mixing for room temperature viscosity using a MacMichael Viscometer with a No. 26 or 30 torsion wire and a procedure widely used in plywood mills. This viscometer can be used to determine viscosities in resins and resin glues, with the torsion wire selected according to the consistency of the sample, so that the wire is not twisted more than one full turn during testing. The sample is placed in a 250 ml metal beaker and adjusted to a standard temperature of 21° C. The beaker is placed in the holder, which is adjusted so that the bobbin is immersed to the 3 cm mark. The motor is actuated so that the beaker revolves at 24 RPM, and the reading (In MacMichael units) is recorded after dial movement has stopped. In all cases, the brass bobbin 1 cm in diameter (or brass bobbin with 1 cm diam. shaft and brass disc 4.44 cm in diam and 0.635 cm thick) was used.

The finished glue compositions were applied to fir or spruce plies, which were prepressed cold and hot-pressed to form plywood. The glue formulations and viscosity results are shown below in Table 2. The prepressed (cold-pressed) laminates were tested using a standard Borden Chemical procedure in which the maximum pounds pull exerted on a 37.5 sq. inch cross section of the laminated plies pulled apart on a prepress jig after various times of assembly (closed or open, respectively) was determined. The assembled panels were cold pressed at 200 psig for about 5 minues, then removed from the press and allowed to sit for 5 minutes before testing. A steady and reproducible force was provided by using a Modulus of Rigidity Machine in which the control was moved at a speed of 3 in./min. The results obtained and plotted in FIGS. 1 and 2 indicated that the bond formed by cold pressing the laminate containing a glue with pea flour extender was initially not as strong as that formed with all wheat flour extender in the glue. Additional glue compositions were prepared which used a corncob-based filler in addition to the pea flour, without improving upon these results.

The hot-pressed laminates were tested by standard procedures [CSA Standard 0121-M1978, 5.1.4.1 (Shear)] for dry shear failure. The dry shear values were equivalent for laminates prepared with either glue.

TABLE 2

Timber Plywood Urea-Formaldehyde resin glue compositions and viscosity results.

| Components | Ex. 1 | Comp. Ex. A |
|---|---|---|
| | (Parts by Weight) | |
| Water | 16.7 | 20.0 |
| CR2664 resin | 52.9 | 52.9 |
| Sterox ® DJ | 0.3 | 0.3 |
| Urea wheat flour | — | 24.3 |
| Pea flour[1] | 27.9 | — |
| W268 hardener | 2.2 | 2.5 |
| | 100.0 | 100.0 |
| Viscosity (MM26S) at 70° F., MacMichael units | 26 | 21 |

[1]"Century" pea flour

Figure 1:
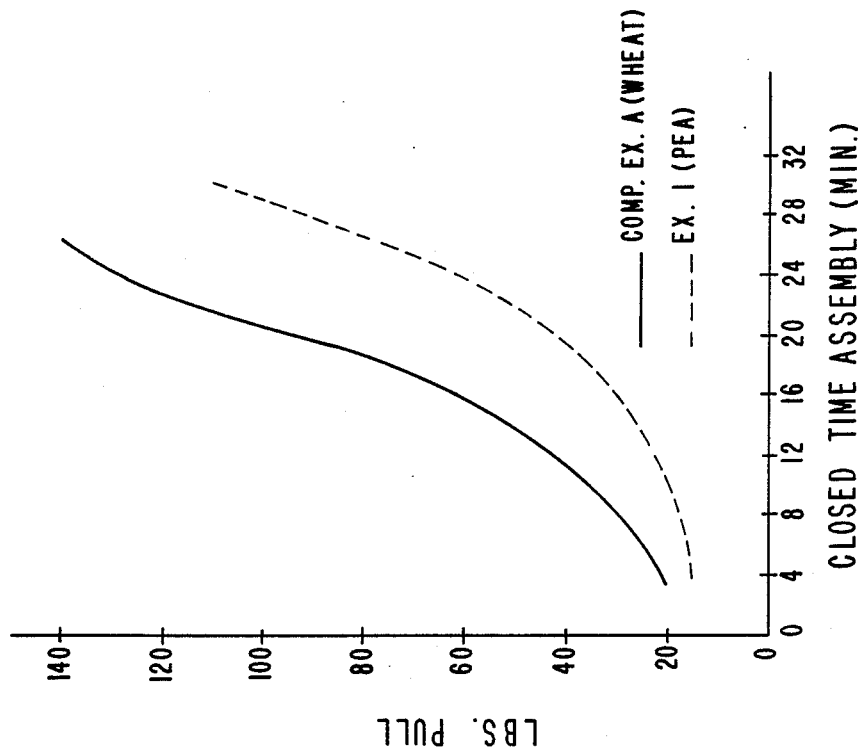
FIG. 1 illustrates the maximum pounds pull attained on a 37.5 sq. in. cross section of plies cold-pressed with a glue composition of the invention and a control, after varying times of assembly (closed).

It can be seen in FIGS. 1 and 2 that even though slightly more pea flour than wheat flour was used, making the viscosity of the composition containing pea flour initially higher, a lower cold prepress strength was obtained with the pea flour glue composition. However, it is important to note that the hot-pressed laminates had equivalent strengths.

EXAMPLES 2, 3 AND 4 AND COMPARATIVE EXAMPLES B, C AND D

REPLACEMENT OF WHEAT FLOUR BY PEA FLOUR IN PHENOL-FORMALDEHYDE RESIN PLYWOOD GLUE

Plywood glue compositions based upon phenol-formaldehyde resins were prepared by standard mixing procedures, replacing a wheat flour extender with pea flour at three different levels. After mixing the principal ingredients for about 20 minutes, final increments of resin and water were added and mixing completed. The compositions employed, their viscosities, the strengths of cold prepressed laminates (of sanded spruce veneer) and the results of wood failure tests on the hot pressed laminates are shown below in Tables 3, 4 and 5.

Plywood Testing Procedure

Figure 4:
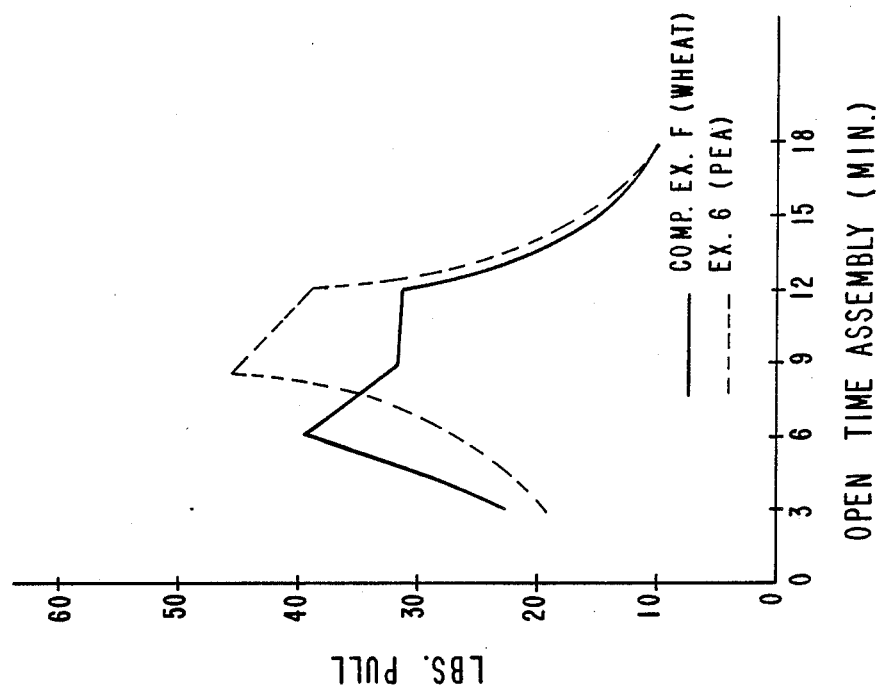
FIG. 4 illustrates the maximum pounds pull attained on a 37.5 sq. in. cross section of plies cold-pressed with a glue composition of the invention containing a high fiber pea flour and a control composition, after varying times of assembly (open).
Figure 3:
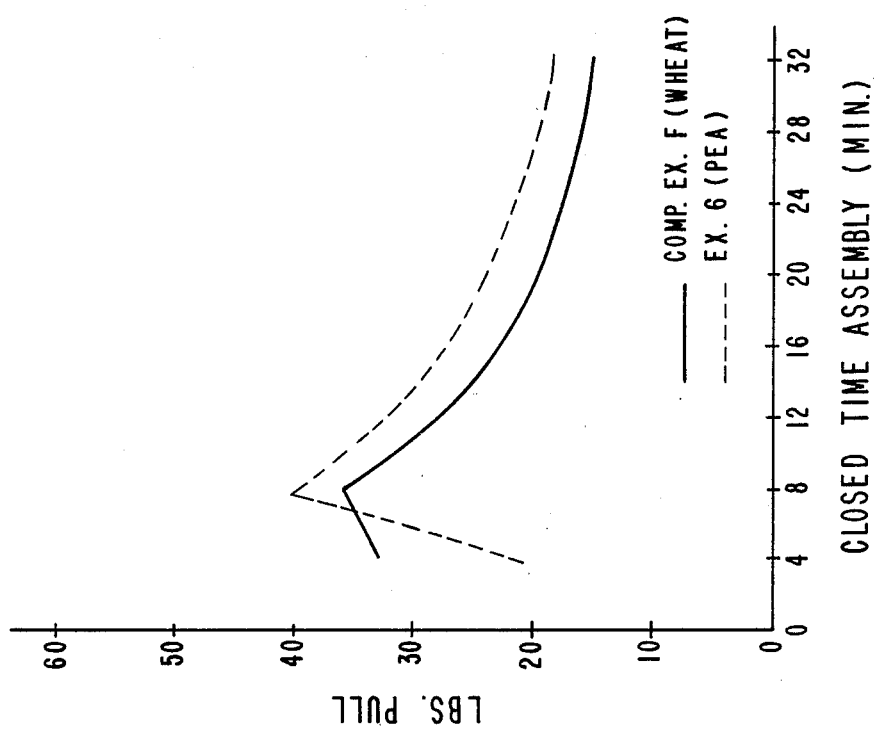
FIG. 3 illustrates the maximum pounds pull attained on a 37.5 sq. in. cross section of plies cold-pressed with a glue composition of the invention containing a high fiber pea flour and a control composition, after varying times of assembly (closed).

Shear test specimens were prepared by cutting pieces of the dimensions shown in FIG. 3 of CSA Standard 0121-M1978 and cut with kerfs as shown in FIG. 4 of the standard. Of the ten specimens, five were conditioned by boiling in accordance with Clause 5.1.3.3(a) of the standard (Four hours, boiling followed by 20 hours' drying at 63±3° C., then boiled again for 4 hours and cooled in water); the remaining five samples were subjected to the Vacuum Pressure Cycle of Clause 5.1.3.3(b), in which they were submerged in cold tap water, a vacuum of 85 kPa (635 mm of mercury) was drawn on the vessel and maintained for 30 minutes, followed immediately by the application of 450–480 kPa pressure for 30 minutes, duration. Immediately after conditioning, all shear test specimens were tested while wet by tension loading to failure in a Globe shear testing machine operated at a loading rate of 2500–4500 N/min. in accordance with Clause 5.1.4.1 of the standard. After testing, the specimens were dried and the percentage of wood failure estimated for each.

TABLE 3

Pea flour as 35 weight percent of total filler and extender In Golden[1] total available solids phenol-formaldehyde glue composition used in preparing 5 ply laminate of sanded spruce veneer.

| Components | Ex. 2 | Comp. Ex. B |
|---|---|---|
| | (Parts by Weight) | |
| BCW2001 resin | 66.5 | 66.5 |
| Water | 18.5 | 18.5 |
| Walderfil ® filler | 2.5 | 2.5 |
| Plybond AC ® filler | 5.5 | 5.5 |
| Wheat flour (Ellisons #3) | — | 4.4 |
| Pea Flour[2] | 4.4 | — |
| Soda ash | 2.6 | 2.6 |
| | 100.0 | 100.0 |
| Viscosity (26MMD) at 70° F. (MacMichael units) | 119 | 121 |
| Overnight, 68° F. | 149 | 183 |
| After 18 days | 185 | 340 |

[1] A glue formulation intended for a particular mill.
[2] Century pea flour

These data indicate that the inventive composition of Example 2 had a more stable viscosity than that of Comparative Example B.

TABLE 3 (CONT.)

WOOD FAILURE TEST RESULTS

| PT/TA[1] | | V.P. (%)[3] | | SHEAR PSI | |
|---|---|---|---|---|---|
| | | EX. 2 | COMP. EX. B | EX. 2 | COMP. EX. B |
| PT | CTA | (PEA) | (WHEAT) | (PEA) | (WHEAT) |
| 3.5 | 10 | 63 | 39 | 85 | 102 |
| 4 | 10 | 84 | 91 | 79 | 81 |
| 5.5 | 10 | 95 | 98 | 73 | 171 |
| PT | OTA | | | | |
| 5.5 | 20 | 90 | 91 | 221 | 225 |
| 5.5 | 30 | 95 | 98 | 186 | 167 |
| 5.5 | 40 | 82 | 84 | 172 | 114 |
| Average | | 85 | 84 | 136 | 143 |

[1] Press Time/Time of Assembly (min.)
[2] Vacuum Pressure Test, percent wood failure observed These data indicate that plywood specimens produced with the inventive and control glue compositions had generally equivalent strengths, based upon vacuum pressure and shear tests.

TABLE 4

Pea flour as 54% of total fillers and extenders in Armstrong[3] 23.4% total available solids phenol-formaldehyde glue composition

| Components | Ex. 3 | Comp. Ex. C |
|---|---|---|
| | (Parts by Weight) | |
| BCW2001 resin | 67.2 | 67.2 |
| Water | 17.9 | 17.9 |
| Plybond ® AC filler | 6.1 | 6.1 |
| Wheat flour[1] | — | 7.1 |
| Pea flour[2] | 7.1 | — |
| Soda ash | 1.7 | 1.7 |
| | 100.0 | 100.0 |
| Viscosity (26MMD) at 70° F., MacMichael units | 125 | 123 |
| After 2 days | 146 | 239 |
| After 12 days | 180 | 347 |

[1] Rogers phenolic midds
[2] Century pea flour
[3] A glue composition prepared for Armstrong mill.

PREPRESS RESULTS - LBS. PULL ON 37.5 SQ. IN. PLIES

| OTA (min.) | Ex. 3 (Pea) | Comp. Ex. C (Wheat) |
|---|---|---|
| 3 | 30 | 39 |
| 6 | 33 | 43 |
| 9 | 49 | 56 |
| 12 | 45 | 41 |
| 15 | 35 | 20 |
| 18 | 34 | 22 |

WOOD FAILURE TEST RESULTS

| PT/TA[1] | | V.P. (%)[1] | | SHEAR PSI | |
|---|---|---|---|---|---|
| | | EX. 3 | COMP. EX. C | EX. 3 | COMP. EX. C |
| PT | CTA | (PEA) | (WHEAT) | (PEA) | (WHEAT) |
| 3.5 | 10 | 30 | 49 | 203 | 216 |
| 5.5 | 10 | 83 | 88 | 171 | 290 |
| PT | OTA | | | | |
| 5.5 | 30 | 93 | 93 | 230 | 234 |
| Average | | 69 | 77 | 201 | 247 |

[1] As in Table 3.

These data indicate that the inventive glue composition of Example 3 provided a more stable viscosity than that of Comparative Example C. The strengths of the bonds were slightly greater for the specimens produced with the control composition, based upon vacuum pressure and shear tests.

TABLE 5

Pea flour as 57.6% of total fillers and extenders in Golden[3] 24% total available solids phenol-formaldehyde glue composition used on all fir veneer in producing 5 ply laminates.

| Components | Ex. 4 | Comp. Ex. D |
|---|---|---|
| | (Parts by Weight) | |
| BCW2001 resin | 66.5 | 66.5 |
| Water | 18.5 | 18.5 |
| Walderfil ® filler | 2.5 | 2.5 |
| Plybond ® AC filler | 2.8 | 5.5 |
| Wheat flour[1] | — | 4.4 |
| Pea flour[2] | 7.1 | — |
| Soda ash | 2.6 | 2.6 |
| | 100.0 | 100.0 |
| Viscosity (26MMD) at 70° F., MacMichael units | 120 | 116 |
| After 2 days | 198 | 185 |
| After 12 days | 242 | 262 |

[1] Ellisons No. 3
[2] Century pea flour
[3] Glue composition prepared for the Golden mill

PREPRESS RESULTS - LBS. PULL ON 37.5 SQ. IN. PLIES

| OTA (min.) | Ex. 4 (Pea) | Comp. Ex. D (Wheat) |
|---|---|---|
| 3 | 24 | 33 |
| 6 | 43 | 44 |
| 9 | 40 | 36 |
| 12 | 37 | 32 |
| 15 | 30 | 21 |
| 18 | 27 | 22 |

WOOD FAILURE TEST RESULTS

| PT/TA[1] | | V.P. (%)[1] | | SHEAR PSI | |
|---|---|---|---|---|---|
| | | EX. 4 | COMP. EX. D | EX. 4 | COMP. EX. D |
| PT | CTA | (PEA) | (WHEAT) | (PEA) | (WHEAT) |
| 3.5 | 10 | 69 | 80 | 205 | 136 |
| 5.5 | 10 | 77 | 88 | 127 | 180 |
| PT | OTA | | | | |
| 5.5 | 30 | 47 | 38 | 99 | 75 |
| Average | | 64.3 | 68.7 | 144 | 130 |

[1] As in Table 3

These data indicate that the inventive composition of Example 4, in which the extender and part of the filler were replaced by pea flour, had a stabler viscosity than that of Comparative Example D. The strengths of the bonds formed were generally comparable.

These examples illustrate that viscosity buildup in urea-formaldehyde or (especially) phenol-formaldehyde glue compositions during storage is less when a pea flour is substituted in the conventional glue for the wheat flour extender. Thus, such glue compositions can have a longer shelf or pot life. Glues containing pea flour did not initially provide as strong a bond in cold-pressing as the wheat flour compositions, but within about 6 minutes the strength of the bond increased, and was maintained at a high level, while the bond strength of the samples prepared with the conventional glues fell off sharply. These results indicate that glue compositions containing reasonable proportions of pea flour should be useful in applications where assembly of cold-pressed components in a short time is not critical, and may even be advantageous if the cold-pressed assemblies must be stored for a time before further processing.

Based upon vacuum-pressure failure tests of the hot-pressed plywood, pea flour can be used to replace up to about 35 weight percent (and perhaps more) of the total extender and filler in phenolic glue compositions without reducing bond strength. When pea flour was included at the 54 percent level, the bonds in the plywood were not as strong. In trials run with pea flour at 57.6 weight percent and the glue applied to all fir veneer, the bonds in the plywood containing pea flour were still weaker than those in the conventional product with wheat flour, but the wood failure test results in this fir plywood were better than when all spruce veneer was used. Thus, the type(s) of veneer used may affect the relative advantages or disadvantages of substituting various amounts of pea flour for wheat flour extenders and/or fillers in such glue compositions.

Since the prepress trials were not particularly favorable with the urea-formaldehyde glue compositions in which pea flour replaced a portion of the wheat flour extender, extensive trials were not conducted to determine the limits of such substitution without adverse effects on the strength of the hot pressed laminates. However, based upon Example 1, in which pea flour was used as about 53 weight percent of the resin, or 28 weight percent of the total composition, such leguminous extenders could be used as up to about 20 weight percent of the resin without adversely affecting the cold prepress strength.

EXAMPLE 5 AND COMPARATIVE EXAMPLE E

STORAGE VISCOSITIES OF PHENOL-FORMALDEHYDE RESIN GLUES CONTAINING PEA OR WHEAT FLOUR EXTENDERS

Figure 5:
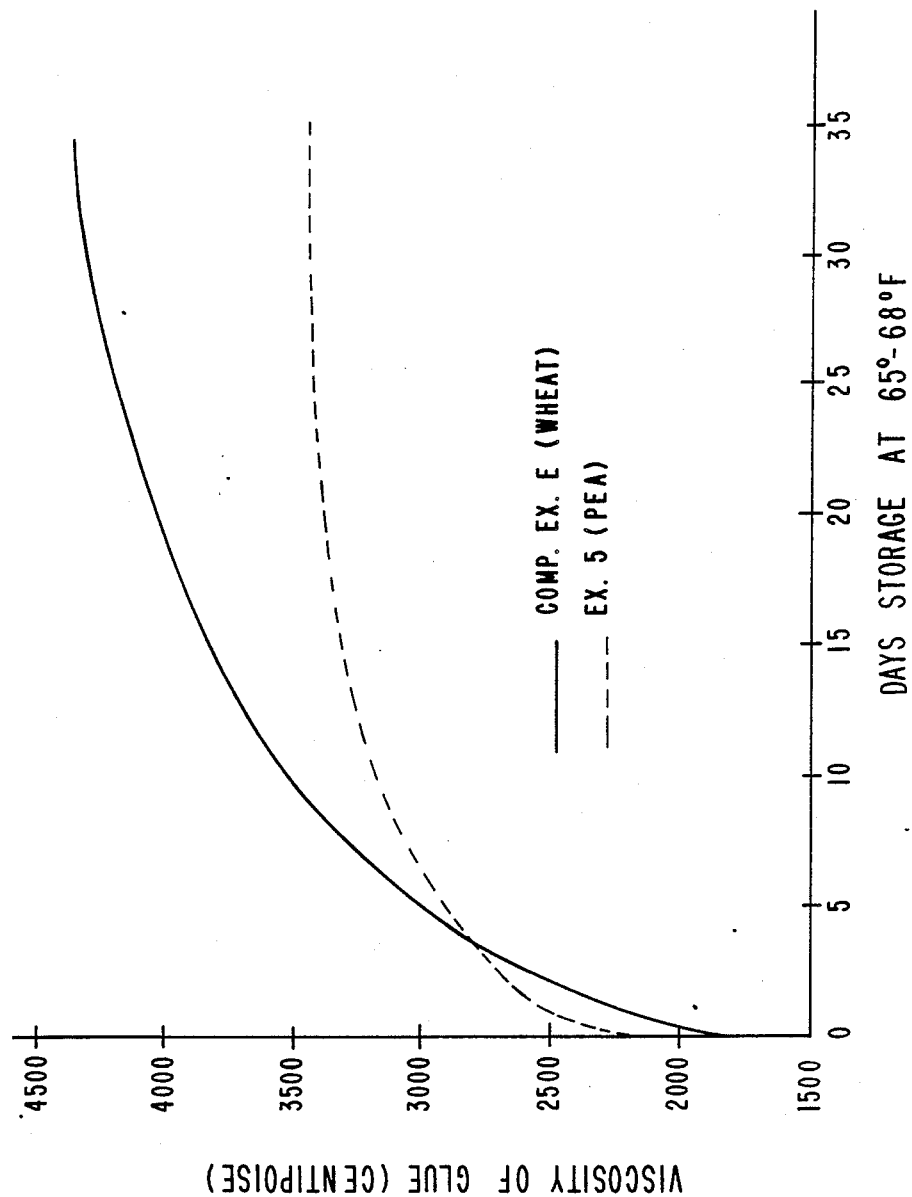
FIG. 5 illustrates the variation in viscosity during storage of a glue composition of the invention containing a high fiber pea flour and a control.

Various glue formulations having different levels of pea flour in phenol-formaldehyde resin as glue extenders were prepared and tested in comparison to conventional wheat flour modified resin compositions. The important property of glue viscosity as measured by a Brookfield viscometer at room temperature was used for the comparison. The viscosities over various days storage were compared for the following two glue formulas (Table 6), with the glue viscosity results shown in Table 7 and FIG. 5.

TABLE 6

| Components | Ex. 5 | Comp. Ex. E |
|---|---|---|
| | (Parts by Weight) | |
| BCW2001 resin | 66.5 | 66.5 |
| Water | 18.5 | 18.5 |
| Filler[3] | 8.0 | 8.0 |
| Wheat flour[1] | — | 4.4 |
| Pea flour[2] | 4.4 | — |
| Soda ash | 2.6 | 2.6 |
| | 100.0 | 100.0 |

[1]Rogers phenolic midds
[2]"Superfine" grade, Woodstone Foods
[3]Mixture of Walderfill and Plybond AC ®

TABLE 7

| | 20 rpm Viscosity, cps | |
|---|---|---|
| Days storage, 15-20° C. | Comp. Ex. E (Pea) | Ex.5 (Wheat) |
| 0 | 2160 | 1776 |
| 1 | 2580 | 2232 |
| 2 | 2688 | 2496 |
| 3 | 2772 | 2700 |
| 4 | 2844 | 2856 |
| 5 | 2928 | 3024 |
| 10 | 3204 | 3540 |
| 15 | 3336 | 3864 |
| 20 | 3408 | 4056 |
| 25 | 3456 | 4212 |
| 30 | 3480 | 4356 |
| 35 | 3504 | 4416 |

In practical exterior grade plywood production, the useful glue viscosity range is from about 1200 to 3600 cps. The glue composition of Ex. 5, containing pea flour in place of the wheat flour extender, thus maintained a stable viscosity within this range for more than twice as long as the conventional wheat flour-extended composition of Comparative Example E.

EXAMPLE 6 AND COMPARATIVE EXAMPLE F

REPLACEMENT OF WHEAT FLOUR BY "SUPERFINE" PEA FLOUR IN PHENOL-FORMALDEHYDE RESIN PLYWOOD GLUE

The "Superfine" grade of pea flour from Woodstone Foods was used to replace 35 weight percent of the total extender (wheat flour) and filler in a Golden phenol-formaldehyde plywood glue formulation containing 24 weight percent total available solids. After initial trials with "Century" grade flour, further trials were conducted with the "Superfine" because it was less expensive and offered certain other advantages. The glue compositions were mixed by standard procedures, as described in the previous examples. The glues were used to prepress and heat cure plywood panels containing five plies of sanded spruce veneer. (An initial laboratory comparison was inconclusive because of surface inactivation of the spruce veneer, but when sanded spruce veneer was used, the glues containing pea flour produced plywoods which yielded higher shear and vacuum pressure wood failure values than for the plywoods produced with the control glue.) The glue compositions employed, their viscosities, the strengths of cold prepressed laminates of sanded spruce veneer and the results of wood failure tests on the hot pressed laminates (or plywood) are shown in Table 8 and in FIGS. 3 and 4. All tests were conducted as described above for Examples 2, 3 and 4.

TABLE 8

Superfine pea flour used as 35% of total filler and extender in Golden 24% total available solids phenol-formaldehyde resin glue composition used in preparing 5 ply laminates of sanded spruce veneer.

| Components | Ex. 6 | Com. Ex. F |
|---|---|---|
| | (Parts by Weight) | |
| BCW2001 resin | 66.5 | 66.5 |
| Water (total) | 18.5 | 18.5 |
| Walderfil ® filler | 2.5 | 2.5 |
| Plybond AC ® filler | 5.5 | 5.5 |
| Wheat flour (Ellisons No. 3) | | 4.4 |
| Pea flour[1] (Superfine) | 4.4 | |
| Soda ash | 2.6 | 2.6 |
| | 100.0 | 100.0 |
| Viscosity (26MMD) at 70° F. (MacMichael units) | 180 | 148 |
| Overnight, 66° F. | 215 | 186 |
| After 36 days, 66° F. | 292 | 369 |

[1]See Table 1

WOOD FAILURE TEST RESULTS

| PT/TA[1] | | V.P. (%)[1] | | SHEAR PSI | |
|---|---|---|---|---|---|
| PT | CTA | EX. 6 COMP. (PEA) | EX. F (WHEAT) | EX. 6 COMP. (PEA) | EX. F (WHEAT) |
| 3.5 | 10 | 62 | 21 | 221 | 166 |
| 4 | 10 | 89 | 74 | 254 | 230 |
| 4.5 | 10 | 92 | 90 | 192 | 133 |
| 5.5 | 10 | 91 | 87 | 231 | 165 |
| PT | OTA | | | | |
| 5.5 | 10 | 86 | 84 | 225 | 166 |
| 5.5 | 20 | 93 | 92 | 231 | 225 |
| 5.5 | 30 | 92 | 89 | 234 | 209 |
| 5.5 | 40 | 78 | 80 | 115 | 109 |
| Average | | 85 | 77 | 213 | 175 |

[1]As in Table 3

These trials illustrated that as with the "Century" flour, glues containing pea flour in accordance with the invention initially produced lower prepress strengths than the control glues containing wheat flour extender. However, after approximately six minutes time assembly (whether open or closed), the cold prepress strengths of the pea flour samples were higher than those with wheat flour, and remained so over the range of time assemblies tested. In contrast to the results obtained in Examples 1, 2, 3 and 4 with the Century pea flour, the initial glue viscosities for the Superfine pea flour glues were higher than for the wheat flour control glue. However, the rate of viscosity increase was lower for the pea flour glues than for the wheat flour glue, so that after about 5 days storage their viscosities were less than for the wheat flour glue.

EXAMPLES 7 TO 9

COMMERCIAL TRIALS REPLACING WHEAT FLOUR EXTENDER AND FILLER WITH "SUPERFINE" PEA FLOUR IN PHENOL-FORMALDEHYDE RESIN PLYWOOD GLUE

Trials were conducted at a commercial plywood plant, replacing the wheat flour extender (a fine grade of wheat flour containing no bran) partially with "Superfine" pea flour in varying amounts to adjust the viscosity to that normally obtained with the commercial wheat flour glue. The glue originally contained 22 weight percent of total fillers and extenders, and the pea flour version finally contained pea flour as 25 weight percent of the total fillers plus extenders in glues having the same viscosity as the commercial wheat flour glue. Trial runs in which various numbers of plies of freshly dried spruce veneer were cold prepressed and heat pressed to form plywood were successful, but detailed strength tests of the laminates were not run. Surprisingly, it was found that a glue matching the viscosity of the commercial wheat flour formulation (90 MacMichael units) could be prepared in which a portion of the filler was effectively replaced by water, resulting in a net saving amounting to 16 weight percent of the filler normally used. The glue compositions tested and their viscosities are shown in Table 10.

TABLE 10

Superfine pea flour was used to replace the wheat flour extender in a commercial Cantree phenol-formaldehyde resin plywood glue formulation, with the amount of filler reduced to adjust the viscosity to that of the normal commercial wheat flour formulation.

TABLE 10

Superfine pea flour was used to replace the wheat flour extender in a commercial Cantree phenol-formaldehyde resin plywood glue formulation, with the amount of filler reduced to adjust the viscosity to that of the normal commercial wheat flour formulation.

| Components | Ex. 7 | Ex. 8 | Ex. 9 |
|---|---|---|---|
| BCW2001 resin | 64.8 | 64.8 | 64.8 |
| Water | 18.5 | 19.4 | 20.4 |
| Plybond AC filler | 11.6 | 10.7 | 9.7 |
| Pea flour, Superfine[1] | 3.3 | 3.3 | 3.3 |
| Soda ash | 1.9 | 1.9 | 1.9 |
| Total | 100.1 | 100.1 | 100.1 |
| Viscosity (26MMD) (at 70° F.) | 125 | 115 | 90 |

[1]See Table 1

These results illustrate that pea flours can be used in place of wheat flour extenders in phenol-formaldehyde resin glue formulations, with the content of fillers reduced (or increased) to match the desired viscosity of commercial wheat flour formulations. In addition to the lower cost of some pea flours compared to wheat flour (particularly the superfine grades, which are essentially byproducts), reduced contents of filler offer further savings.

That which is claimed is:

1. An adhesive composition comprising at least one curable aldehyde condensation resin and an extender comprising a leguminous flour wherein said leguminous flour comprises at least one pea flour.

2. The adhesive composition as claimed in claim 1 wherein said resin is a formaldehyde condensation resin.

3. The adhesive composition as claimed in claim 2 wherein said resin comprises at least one resin selected from the group consisting of phenol-formaldehyde resins, urea-formaldehyde resins, aniline-formaldehyde resins, resorcinol-formaldehyde resins and melamine-formaldehyde resins.

4. The adhesive composition as claimed in claim 2 wherein said resin comprises a thermosettable phenol-formaldehyde resin.

5. The adhesive composition as claimed in claim 2 wherein said resin comprises a urea-formaldehyde resin.

6. The adhesive composition as claimed in claim 1 wherein said resin comprises a urea-formaldehyde resin modified by the addition of a phenol-formaldehyde resin.

7. The adhesive composition as claimed in claim 1 wherein the aldehyde of said aldehyde condensation resin is selected from the group consisting of formaldehyde, acetaldehyde, propionaldehyde, crotonaldehyde, benzaldehyde, furfuraldehyde and mixtures thereof.

8. The adhesive composition as claimed in claim 1 wherein the aldehyde condensation resin is prepared from a phenol-based body selected from the group consisting of phenol, amino phenol, the ortho, meta and para cresols, cresylic acid, xylenol, resorcinol, catechol, quinol, pyrogallol, phloroglucinol and mixtures thereof.

9. The adhesive composition as claimed in claim 1 wherein said aldehyde condensation resin is an aminoplast resin prepared with a nitrogen compound selected from the group consisting of urea, thiourea, methylurea, acetylurea, guanidine, cyanamide, dicyanodiamide, biuret, semi-carbazide, melamine, monophenylmelamine, ammeline, thioammeline, ammelide, formoguanamine, acetoguanamine, stearoguanamine and mixtures thereof.

10. An adhesive composition as claimed in claim 1 wherein said extender further comprises at least one cereal grain flour.

11. An adhesive composition as claimed in claim 10 wherein said cereal grain flour is at least one wheat flour.

12. An adhesive composition as claimed in claim 1 wherein said leguminous flour further comprises flour prepared from at least one legume selected from the group consisting of beans and lentils.

13. An adhesive composition as claimed in claim 1 wherein said leguminous flour further comprises flour prepared from at least one legume selected from the group consisting of defatted peanuts and defatted soybeans.

14. An adhesive composition as claimed in claim 12 wherein said leguminous flour contains at least about 20 weight percent protein.

15. An adhesive composition as claimed in claim 1 wherein said pea flour contains at least about 20 weight percent protein and at least about 5 weight percent fiber.

16. An adhesive composition as claimed in claim 15 wherein at least 95 percent of the particles of said pea flour will pass a 70 mesh sieve.

17. An adhesive composition comprising a phenol-flormaldehyde condensation resin, water and an extender comprising at least one leguminous flour as from about 70 to about 100 weight percent of said extender, said leguminous flour comprising at least one pea flour, and a wheat flour as from 0 to about 30 weight percent of said extender.

18. An adhesive composition as claimed in claim 17 wherein said phenol-formaldehyde resin is prepared by condensing from about 1.5 to about 3 moles of formaldehyde per mole of phenol.

19. An adhesive composition as claimed in claim 17 wherein said extender is from about 2 to about 10 weight percent of said composition.

20. An adhesive composition as claimed in claim 17 which includes a filler, at least a portion of which comprises a leguminous flour.

21. An adhesive composition as claimed in claim 17 wherein said leguminous flour is present in an amount effective to produce a storage viscosity at corresponding storage times lower than that of a composition containing an extender consisting essentially of wheat flour.

22. An adhesive composition comprising a urea-formaldehyde condensation resin, water and an extender comprising at least one leguminous flour as from about 70 to about 100 weight percent of said extender, said leguminous flour comprising at least one pea flour, and a wheat flour as from about 0 to about 30 weight percent of said extender.

23. An adhesive composition as claimed in claim 22, further comprising an acid hardener.

24. An adhesive composition as claimed in claim 23 wherein said acid hardener is an ammonium salt of a mineral acid.

25. An adhesive composition as claimed in claim 22 wherein said urea-formaldehyde resin is prepared by condensing from about 1.5 to about 3 moles of formaldehyde per mole of urea.

26. An adhesive composition as claimed in claim 22 wherein said extender is from about 2 to about 30 weight percent of said composition.

27. An adhesive composition as claimed in claim 22 which includes a filler, at least a portion of which comprises a leguminous flour.

28. An adhesive composition as claimed in claim 22 wherein said leguminous flour is present in an amount effective to produce a storage viscosity at corresponding storage times lower than that of a composition containing an extender consisting essentially of wheat flour.

29. A process of preparing a curable adhesive composition comprising the step of adding to a mixture of an aldehyde condensation resin and water an effective amount of an extender comprising wheat flour as from 0 to about 30 weight percent and at least one leguminous flour as from about 70 to 100percent of said extender, said leguminous flour comprising at least one pea flour, to produce a storage viscosity at corresponding storage times lower than that of a comparable composition containing an extender consisting essentially of wheat flour.

* * * * *